(12) United States Patent
Kahn

(10) Patent No.: US 6,678,009 B2
(45) Date of Patent: Jan. 13, 2004

(54) ADJUSTABLE VIDEO DISPLAY WINDOW

(75) Inventor: Michael Kahn, Westampton, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 467 days.

(21) Appl. No.: 09/795,023

(22) Filed: Feb. 27, 2001

(65) Prior Publication Data

US 2002/0118299 A1 Aug. 29, 2002

(51) Int. Cl.[7] .............................. H04N 5/50; H04N 5/21; H04N 9/74
(52) U.S. Cl. ...................... 348/569; 348/607; 348/584; 348/596; 348/913
(58) Field of Search ................................ 348/569, 584, 348/554, 607, 624, 625, 630, 563, 556, 903, 904, 581, 445, 596, 599, 576, 913, 383, 564, 476, 704, 594, 595, 597; H04N 3/27, 5/50, 9/74, 5/21, 5/213, 345/626, 345/628, 345/629, 345/788, 345/790, 345/791, 345/794, 345/798, 345/800, 382/254, 382/256, 382/266

(56) References Cited

U.S. PATENT DOCUMENTS

| | | | | |
|---|---|---|---|---|
| 4,198,653 A | * | 4/1980 | Kamin | 348/155 |
| 4,642,676 A | * | 2/1987 | Weinger | 348/578 |
| 4,827,251 A | * | 5/1989 | Aoki et al. | 345/636 |
| 4,866,524 A | * | 9/1989 | Six | 348/596 |
| 5,097,332 A | * | 3/1992 | Faroudja | 348/488 |
| 5,115,314 A | * | 5/1992 | Ross et al. | 348/596 |
| 5,473,740 A | * | 12/1995 | Kasson | 345/628 |
| 5,587,723 A | * | 12/1996 | Otake et al. | 345/626 |
| 5,737,123 A | * | 4/1998 | Donohoe | 359/450 |
| 5,742,354 A | * | 4/1998 | Vlahos et al. | 348/586 |
| 5,828,351 A | * | 10/1998 | Wu | 345/11 |
| 5,835,813 A | * | 11/1998 | Luong et al. | 348/445 |
| 6,493,036 B1 | * | 12/2002 | Fernandez | 348/561 |

FOREIGN PATENT DOCUMENTS

JP      06339126     * 12/1994

* cited by examiner

*Primary Examiner*—Sherrie Hsia
(74) *Attorney, Agent, or Firm*—RatnerPrestia

(57) ABSTRACT

A method of generating an adjustable video display window from an on screen display (OSD) bitmap is provided. The adjustable video display window masks undesirable video artifacts from a video display. The method includes generating an image pattern, the image pattern being produced by a video display processor of the video display. Parameters of the video display processor are adjusted to vary the dimension of the generated image pattern to redefine the periphery of an active region of the video display so that users of the video display are not able to view undesirable artifacts.

19 Claims, 5 Drawing Sheets

ADJUSTABLE VIDEO DISPLAY WINDOW

The present invention relates, in general, to a method of presenting a video image for display on a consumer television receiver. More particularly, this invention provides a method for improving the appearance of a video image by masking undesirable video artifacts present along the edges of the image using a superimposed framing image.

BACKGROUND OF THE INVENTION

A digital television set top box is typically capable of various display modes and optional monitor settings. Two common modes that do not employ the entire area of the available image display are letterbox and vertical letterbox. Existing analog television receivers may also display content in letterbox mode. Indeed, this mode is commonly used for content played back from digital video disks (DVDs). In other modes, sometimes referred to as full modes, the outer edges of the displayed video are hidden behind a physical bezel of the display monitor. The hiding of the edges of the image behind the bezel is commonly referred to as overscanning the image. The portion of the image that is hidden behind the bezel is known as the overscan portion.

Overscanning is typically done to hide artifacts which may appear at the horizontal and/or vertical edges of the image. One type of artifact is data, such as closed caption information or electronic program guide information that is digitally transmitted in the vertical blanking intervals of standard analog television signal. When an analog TV image such as may be produced by an television signal corresponding to the National Television Standards Committee (NTSC) format is displayed in letterbox mode, the digital data transmitted in the vertical blanking interval for example, closed caption data on line 20, may appear as one or more lines of rapidly moving white dots above the image. This type of distortion would also be produced for television signals that include teletext or videotex information.

Distortion on the vertical edges of an image may occur, for example, when a video image derived from an analog video cassette recorder (VCR) is displayed. This type of distortion occurs because the horizontal synchronization signal provided by the VCR is not an exact sub-multiple of twice the color subcarrier frequency. In the NTSC standard, for example the color subcarrier frequency is 455/2 times the line scanning frequency. When this constraint is not met, as with signals from analog VCRs, the vertical edges of the image may appear to be wavy. This type of distortion may also occur in images from other nonstandard signal sources, such as video games.

Because the letterbox and vertical letterbox modes do not employ the entire area of the available image display, the outermost edges of the video images are visible to the user. Thus, it is possible that some undesirable video data patterns may be visible to the user.

Additionally, with the emergence of digital set top boxes, it is not possible to predict all the cases of unpleasant video artifacts near the edges of the image due to the various analog to digital conversion techniques employed.

Accordingly, an audio visual device is desired which is capable of adjustably concealing the outermost edges of an available image display for use in operation with such modes as letterbox and vertical letterbox.

SUMMARY OF THE INVENTION

The subject invention is embodied in a method of generating an adjustable video display window from an using an on screen display (OSD) bitmap stored in a memory. The adjustable video display window masks undesirable video artifacts from the active portion of the video display. The method includes generating an image pattern which frames the displayed video image to hide artifacts along the edges of the image. This image pattern is produced by a video display processor of either the video display device or the television receiver. Parameters of the video display processor are adjusted to vary the dimension of the generated image pattern to redefine the periphery of an active region of the video display. The OSD image pattern is then mixed with an image signal to construct the OSD image pattern, masking the undesirable video artifacts so that they are to visible to the viewer.

It is to be understood that both the foregoing general description of the invention and the following detailed description are exemplary, but are not restrictive, of the invention.

BRIEF DESCRIPTION OF THE DRAWING

The invention is best understood from the following detailed description when read in conjunction with the accompanying drawings.

DETAILED DESCRIPTION OF THE INVENTION

Certain terminology used in the following description is for convenience only and is not limiting. The term "adjustable window" or "adjustable video display window" are generally defined as referring to an adjustable portion of the active video area which has been visually masked by the user, according to the present invention in order to conceal undesirable video artifacts.

The present invention provides a generated On Screen Display (OSD) image pattern to be superimposed on a displayed video image in order to redefine the periphery of an active region of the video display to mask at least one edge of the displayed video image to hide, from the viewer, artifacts appearing proximate to that edge. In this way, the present invention allows the user to control the adjustable window directly. This provides the viewer with an advantage over systems that employ a fixed window.

I. IRD Hardware

Figure 1:
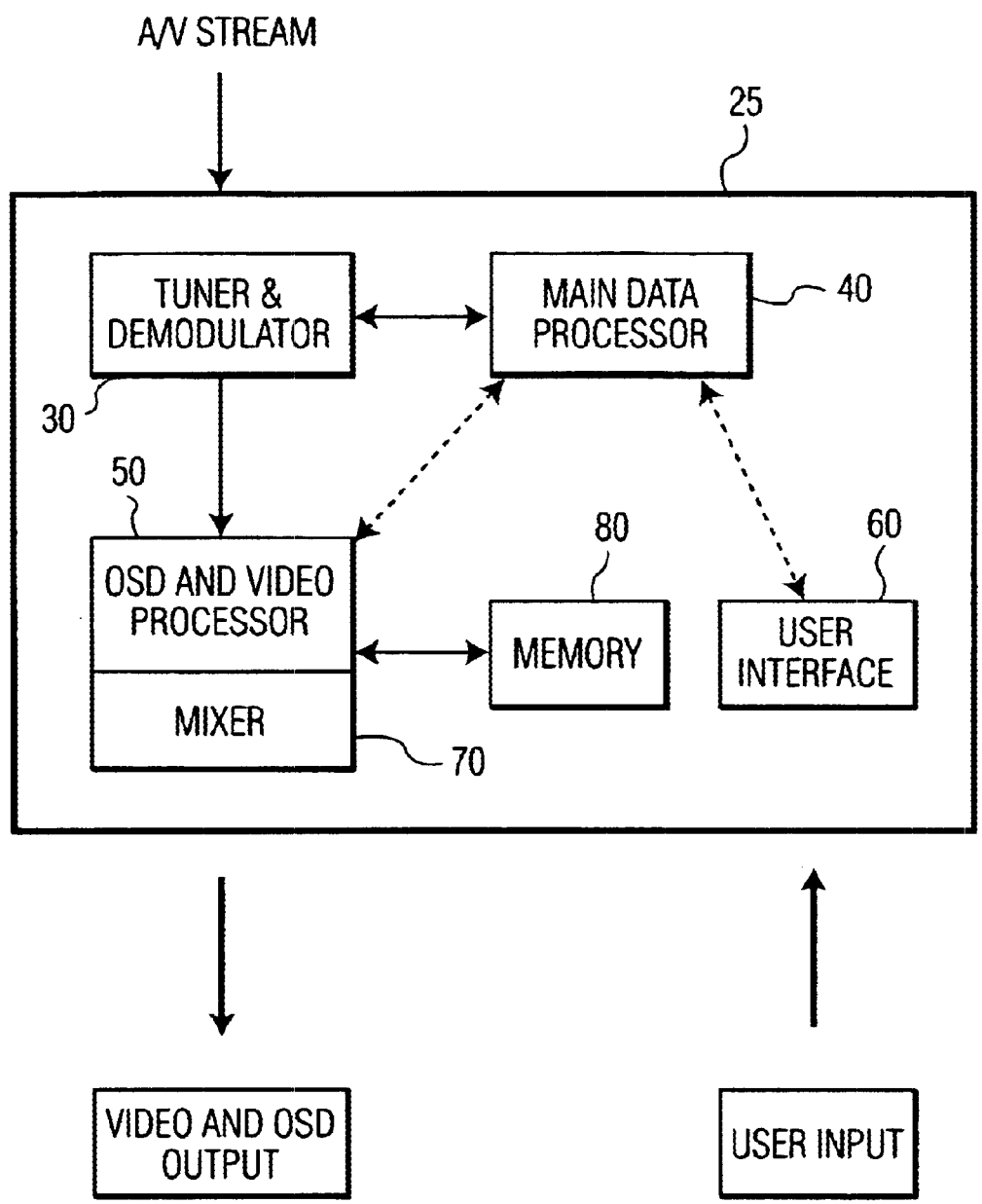
FIG. 1 is a high level block diagram of a typical television integrated receiver and decoder.

Referring now more specifically to the drawings, FIG. 1 shows a high level block diagram of a basic digital television IRD (Integrated Receiver and Decoder) 25 of an exemplary audio-visual device. The IRD includes a tuner and demodulator module 30, a main data processor 40, user interface 60, OSD and video processor 50, mixer 70 and memory 80. Digital audio-visual data flow is represented by the arrow from tuner and demodulator module 30, to OSD and video processor module 50. The main data processor 40 communicates control information with modules 30, 50 and 60, as indicated via the dashed lines.

The digital television receiver processes an audio/video bitstream, encoded, for example, according to the standard specified by the Advanced Television Systems Committee (ATSC). The exemplary system decodes the digital bitstream to present the decoded signals to a corresponding audio and video output of the receiver. Typically, the IRD 25 receives and demodulates digital television signals to recover the bitstreams. The IRD then performs real time audio and video decompression of various data streams (bitstreams) communicated to the device to recover the audio and video data. The IRD 25 also includes a conventional analog television decoder, for example, an NTSC decoder, which demodulates and decodes analog television signals to provide analog audio and video output signals. An exemplary ATSC decoder is described in U.S. Pat. No. 6,175,592 entitled FREQUENCY DOMAIN FILTERING FOR DOWN CONVERSION OF A DCT ENCODED PICTURE.

The tuner and demodulator module 30 receive and demodulate the television signals that include the transmitted digital television bit streams or analog television signals. If a digital television signal is being received, the tuner and demodulator 30 may also separate the transport packets relating to a desired television program and decode the transport packets to provide either program elementary stream (PES) packets or fully decoded audio and video bit-streams to the tuner and demodulator 30. If the tuner and demodulator 30 is processing an analog television signal, it separates the audio and video components and provides the video components to the OSD and video processor 50.

The main data processor 40 performs a plurality of control functions in accordance with control parameters of the control stream. Specifically, the main data processor provides control data to the video processor/OSD 50, manages access to memory 80 and controls the display of decoded images of the data stream. The main data processor 40 may, for example, determine, responsive to a viewer selection, which television program is to be received, decoded and displayed. Using this information the processor 40 controls the tuner and demodulator to tune to the channel that contains the desired program and separate the transport packets for this program from the decoded packet data for that channel. The main data processor 40 may also control the OSD and video processor 50, for example, to adjust the brightness and color balance of the displayed image and to display predetermined text, for example, an operational menu to the viewer using the OSD function of the processor.

User interface 60 includes infrared inputs for receiving data from a remote control device (not shown) and circuitry for receiving manual input of data from a control panel of the audio-visual device. In response to the viewer using the controls on the control panel, this circuitry may, for example, send a message to the main data processor 40, signaling it to display a control menu and then interpret further commands from the viewer as being related to the displayed menu.

The memory 80 is typically a random access memory which stores the OSD bit map, and, for digital programs, the compressed data and one or more decoded images. The memory 80 is preferably partitioned into a plurality of buffers. A bit-stream buffer that stores compressed data, an OSD buffer that stores the OSD bit map (i.e., menu functions, closed caption data and channel logos transmitted from audio visual devices and cable systems), frame buffers that store frames of decoded video images. In this way, OSD and video processor 50 decodes the compressed data in memory 80 and reconstructs the image data for storage in the appropriate buffer. Where the received signal is a digital television signal, the transmitted, compressed data may represent only information that has changed relative to a previously transmitted image. The resulting image is reconstructed by decompressing this residual data and adding it to a stored reference image. Thus, the memory 80 typically holds three images, two reference images and an image that is currently being decoded. One of these images is also being displayed at any given time.

The OSD information is displayed by overlaying the OSD bit-map onto the image that is being displayed. Mixer 70 serves to selectively blend image data with OSD pixel data. The mixer 70 displays each pixel at a location, an OSD pixel, a pixel of an image, or a combination thereof. The output of mixer 70 is an analog video signal that is provided to the display device (not shown) which in turn, is connected to the IRD 25. The signals provided by the IRD 25 may be displayed either on a conventional television monitor having, for example, a 4 by 3 aspect ratio or they may be displayed on a so-called "digital ready" monitor having a 16 by 9 aspect ratio. When, for example, a digital television signal having a 16 by 9 aspect ratio is displayed on a 4 by 3 monitor, it may be displayed in letterbox mode, in which blank areas exist both above and below the active television image. When a 4 by 3 video image generated from an analog television signal or from a standard definition television (SDTV) digital television signal is displayed on a 16 by 9 monitor, it may be displayed in vertical letterbox mode, in which blank areas exist on either side of the active television image.

II. IRD Operation

The general operation of the IRD 25 is now described. Individual video bit streams are separated by the tuner and demodulator 30 from the communication medium (not shown) by demodulating the received DTV signal, recovering the transport packets, separating the transport packets into their respective program streams and converting the transport packets for a selected video bit-stream into PES packets or into an elementary bitstream. As described above and in the referenced patent, the OSD and video processor 50 processes the bit-stream to produce analog video signals that are displayed on the monitor (not shown). In accordance with an instruction set of the main data processor 40, OSD and video processor 50 are enabled to decode the compressed data in memory 80 and to reconstruct the image data for storage in the appropriate buffer.

As described above, the OSD and video processor 50 utilizes memory 80 to store the OSD bitmap. The OSD and video processor 50 provides a defined bitmap for each field of an image which can be superimposed on the decoded video image. When the OSD and video processor 50 is enabled for a particular image or stream of images, the main data processor 40 manipulates the data in the memory 80 to construct an OSD bit stream for input to the mixer along with decoded image data. Typically, the OSD bit stream provides a header portion and a data (pixel) portion. Accordingly, the OSD header contains information concerning the locations of the top and bottom OSD field bit maps, palette data (color), pointer to the next header block and a plurality of display modes involving OSD resolution, color and compression. In this way, an OSD image is constructed by the mixer 70 such as the adjustable window 10 of FIGS. 3A–3B described below.

Thus, the displayed panels that define the letterbox window may be entirely contained in the bitmap image stored in the memory 80 or, at least for simple OSD's, may be entirely specified using OSD headers, without any reference to a stored bitmap. For example, the OSD for displaying closed caption data may specify a black area of certain dimensions onto which the closed caption text is to be displayed. In this embodiment, the text is stored in the OSD bit-map of memory 80 but the black background is generated using parameters specified in the OSD header. In a system according to the present invention, the panels that define a letterbox window may also be specified using only the OSD header, without providing any information from the bit-mapped OSD memory.

Alternatively, the OSD header information may provide only brightness and hue information for the text and the background that are stored in the OSD bit-map of the memory 80. Using a system of this type, the OSD and video processor 70 builds the panels that define the letterbox or vertical letterbox windows pixel-by-pixel in the area of memory 80 that is allocated for the OSD bitmap.

OSD image patterns are arranged by the bit stream header decoded from the OSD bitstreams, the OSD pixel data is then superimposed on the decoded image. Mixer 70 selectively blends or multiplexes the decoded image pixels with the OSD pixels or a combination thereof. An OSD pixel which is multiplexed with an image pixel completely replaces the image pixel in the video display. A blended OSD pixel, however, does not replace the pixel but may, for example, selectively darken the pixel so that the OSD display appears to be a transparent overlay covering a portion of the video image.

III. Adjustable Window

Figure 2A:
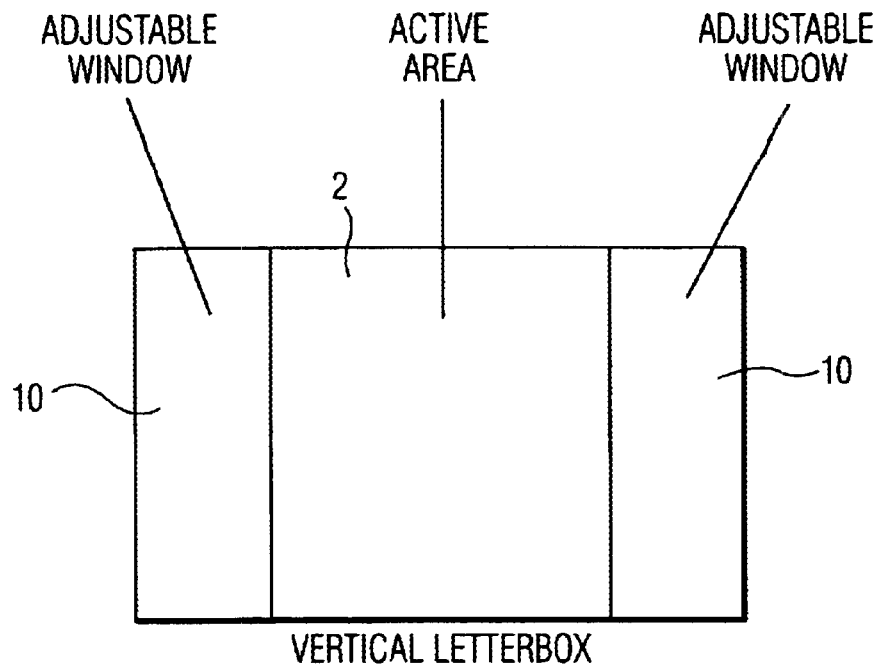
FIG. 2A is a plan view of a vertical letterbox display mode.
Figure 2B:
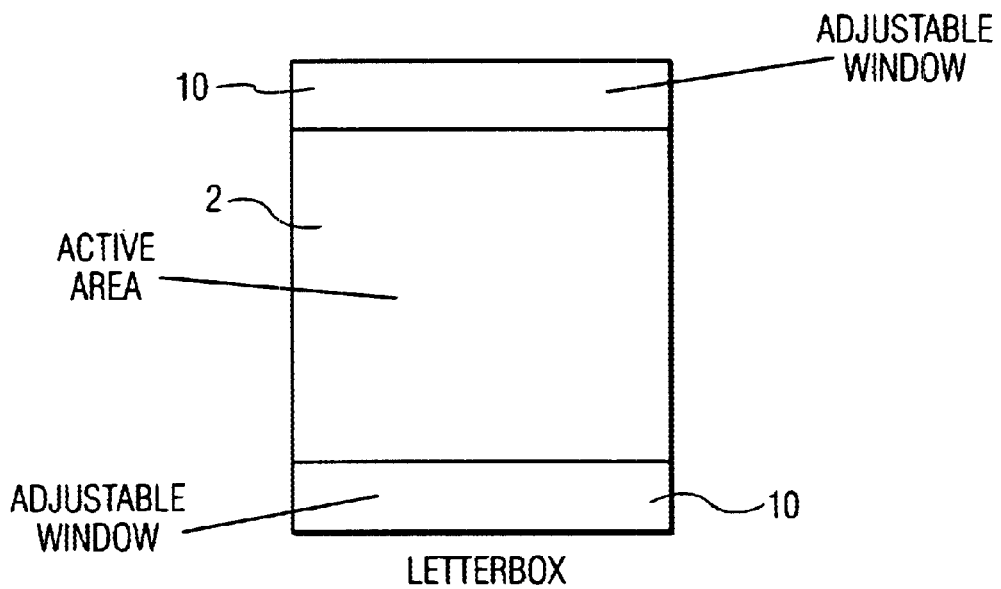
FIG. 2B is a plan view of a letterbox display mode.

FIGS. 2A and 2B show exemplary views of the vertical letterbox and letterbox display modes. When employing these modes on a video display device, it is possible that after conversion, patterns originally present only on horizontal line 21 (outside the area typically visible) have spread down to visible lines of the displayed video image. For this reason, a generated OSD image pattern or "adjustable window" 10 is provided by the method of the present invention to mask artifacts resident in the active area 2 of the image periphery by redefining or masking the boundaries of the active area.

Figure 3A:
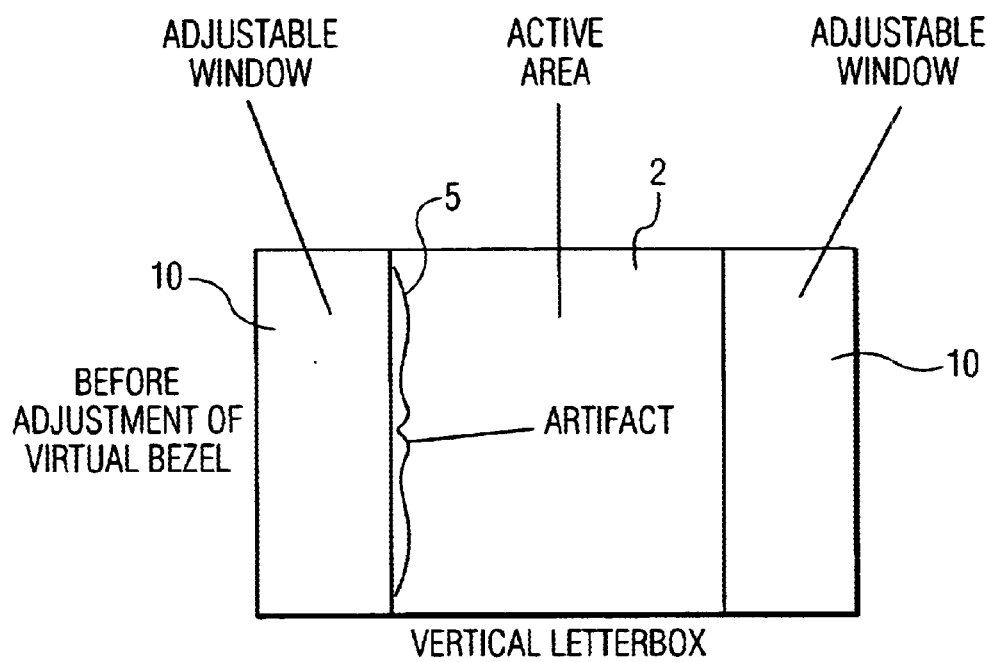
FIG. 3A is a plan view of the vertical letterbox display mode employing an adjustable window in accordance with the present invention.
Figure 3B:
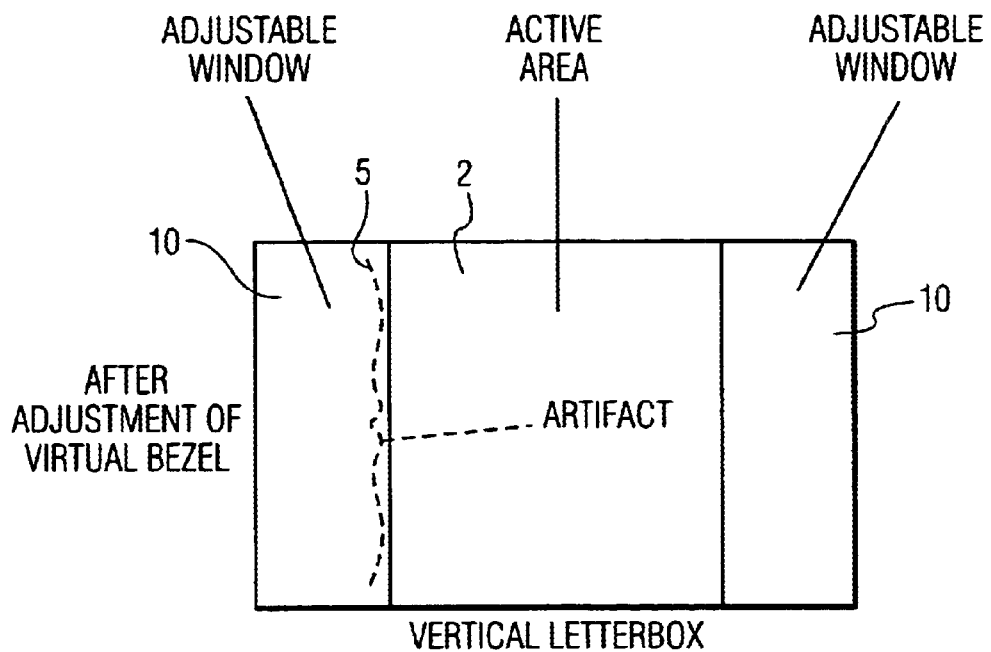
FIG. 3B is a plan view of the vertical letterbox display mode of FIG. 2A after adjusting the adjustable window in accordance with the present invention

Referring now to FIGS. 3A and 3B, adjustable window 10 is shown which can be increased or decreased in size as desired by adjusting the OSD bitmap in memory 80 or by requesting a fixed OSD bitmap with varying parameters that change its dimensions, color and/or shape. This is useful because the original video source, and conversion mechanisms employed for processing video signals affect where the data patterns will occur. FIG. 3A shows an example of the adjustable window 10 for masking artifacts 5 about the periphery of the active video region 2. The artifact 5 may be a wavy vertical edge of the displayed image generated by replaying video signals from a conventional video cassette recorder (VCR). In FIG. 3B, the user has "masked" or superimposed OSD image data (i.e., adjustable window 10) over the artifact, and it is no longer visible to the user, as indicated by the artifact being in phantom. The adjustment of the adjustable window 10 can be performed via user interface 60 which, through use of the OSD bitmap, redefines the active area 2 by superimposing (multiplexing) an OSD image pattern over the periphery of the active region 2.

A user can alter the adjustable window 10 through a remote control (not shown), to communicate desired changes with input interface 60 of FIG. 1. This data is then sent to the main data processor 40, which interprets the data, and passes the data to OSD and video processor 50 to make the users desired changes take effect.

In one exemplary embodiment, the up and down, and right and left arrow keys typically found on a remote control device (not shown) as known to those skilled in the art are used to adjust the size of the window. In this embodiment, a menu is displayed which includes choices for adjusting a letterbox window and adjusting a vertical letterbox window. Once one of these options is selected, the arrow keys may be used adjust the size of the window. The up and down arrow keys are used to adjust the letterbox window and the right and left arrow keys are used to adjust the vertical letterbox window. These adjustments move both panels either closer to or farther away from the center of the screen. In practice, this may be implemented by changing the OSD bitmap in memory 80 or by passing appropriately modified header parameters to the OSD and video processor 50, depending on the OSD implementation for the particular IRD 25. Additionally, a default button, either on the remote control device or accessible from the IRD menu system, can be employed to restore default settings at any time.

Figure 4A:
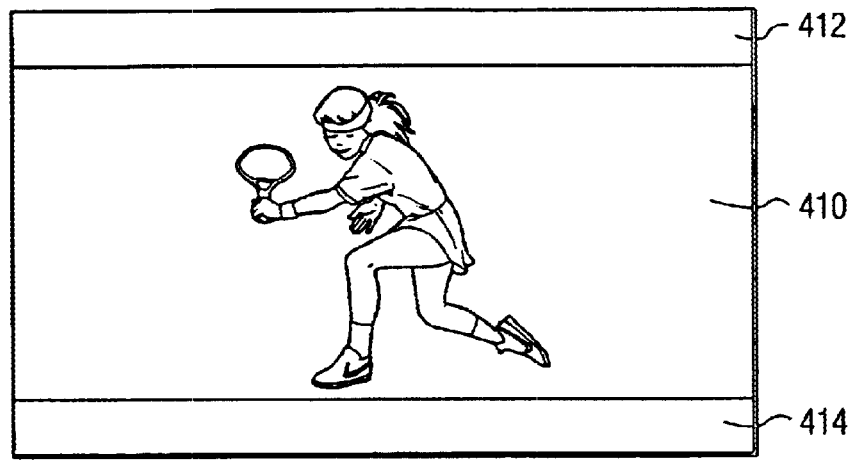
FIGS. 4A, 4B and 4C are screenshots of an exemplary method for adjusting masking panels according to the present invention.
Figure 4B:
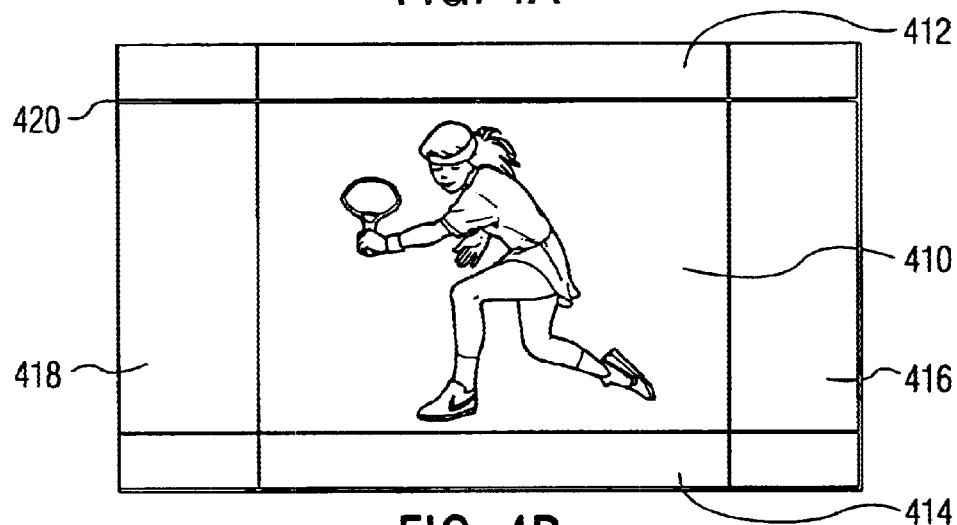
Figure 4C:
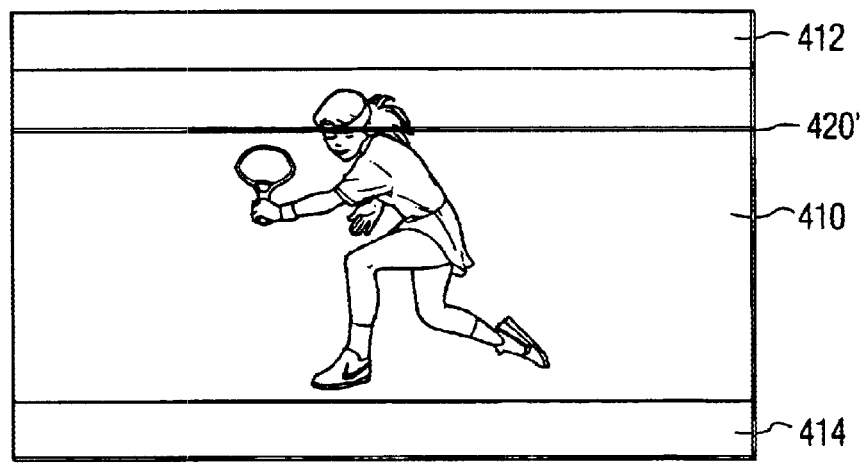

In another exemplary embodiment, shown in FIGS. 4A–4C, the viewer may select one of four panels (left, right, top and bottom) to be adjusted. FIG. 4A shows a video image 410 being displayed in letterbox form with blank areas 412 and 414 above and below the image 410. FIG. 4B shows a screen that may be presented to the viewer to allow the viewer to adjust the panels that define the letterbox. In this example, four panels, 412, 414, 416 and 418 are displayed. The viewer then selects one panel, for example, using the arrow keys. In this instance, the viewer has selected the upper panel 412 as indicated by the highlighted bar 420. Next, the viewer uses the arrow keys to adjust the position of the lower edge of the panel. This adjustment may be indicated by moving the highlighted bar 420 down into the picture are 410. When the viewer is satisfied with the position of the panel, he or she accepts the panel by, for example, pressing the enter key on the remote control device. The selected panel is then displayed in the position accepted by the viewer.

If for example, a viewer watching a program being displayed in letterbox is annoyed by subtitles appearing below the active displayed image, he or she may activate the window adjustment function from a menu defined for the IRD 25, select the bottom panel using, for example, the down arrow key and then, by pressing the up arrow key move the top edge of the bottom panel up so that it conceals the subtitles.

The OSD bitmap parameters may also be entered directly via user interface 60 using panel buttons on the remote control device (not shown). In this embodiment, the viewer uses the panel buttons on the remote control device to select a particular panel or pair of panels and adjusts the selected panel(s) using the arrow keys on the remote control device, as described above.

For all of the adjustment modes described above, a menu showing the viewer the options for adjusting the window may be superimposed on the panels as they are being adjusted and the panels may be superimposed over the active video display. This provides the viewer with feedback to know when the panels are adjusted to their optimum positions. To provide maximum visibility for the panels and the active video, the menu for adjusting the window may be displayed as a transparent menu, as described above.

Figure 5:
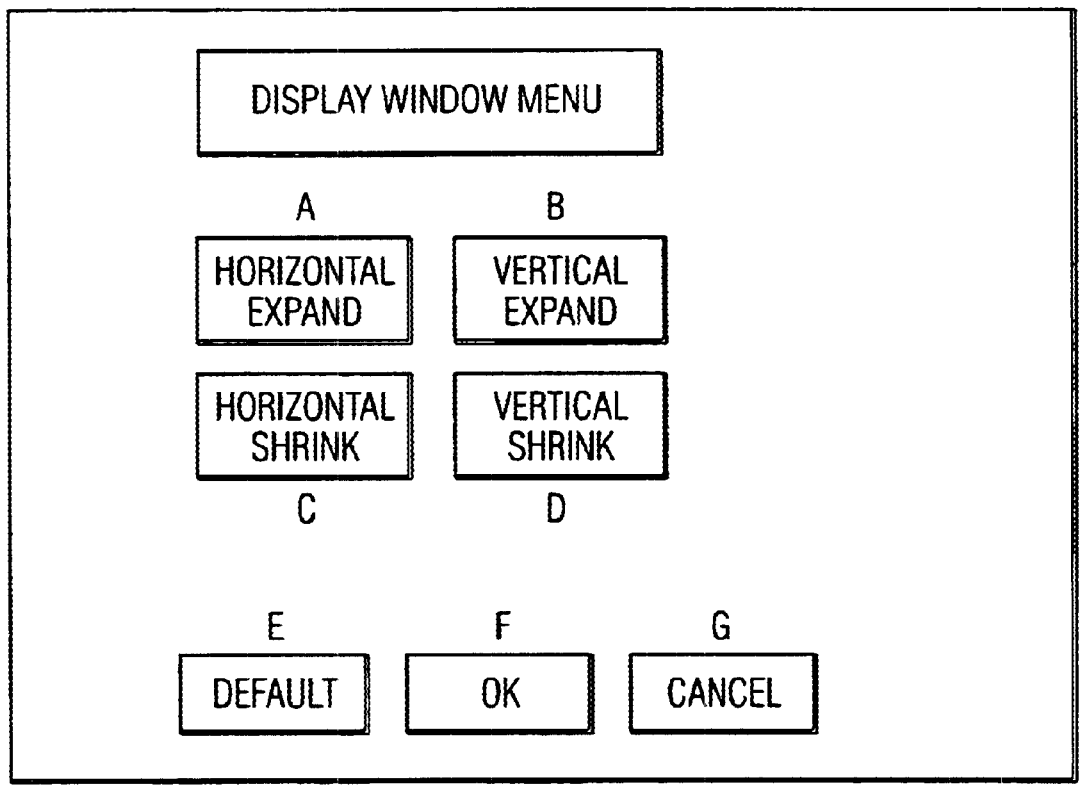
FIG. 5 is a screenshot of an exemplary on-screen menu for adjusting the virtual bezel in accordance with the present invention.

In a further embodiment, the panels may be adjusted using a menu such as that shown in FIG. 5. Items A through G are menu buttons generated by the main data processor 40 using the OSD function of the IRD 25. The user can employ the remote control to scroll through these OSD buttons and select one. Buttons A–D control the horizontal and vertical size of the adjustable display window 10. Button E restores a default setting. Button F accepts the changes, and button G aborts current changes, restoring the previous settings.

Using this menu, the viewer may or may not see the window and the underlying active video as it is being adjusted. In a simple embodiment, the image shown in FIG. 4 is displayed on a blank background, the viewer selects and adjusts the appropriate window panel(s) and then returns to viewing the active video. If the viewer is satisfied with the window size, he or she returns to the menu shown in FIG. 4 and accepts the changes by selecting the OK button F. If the viewer is not satisfied he or she may return to the menu and either continue to adjust the panels or select the CANCEL button G. In the exemplary embodiment of the invention, if, after making a trial adjustment, the viewer does not return to the menu shown in FIG. 4 to either affirm or cancel the adjustment, the system defaults to accepting the adjustment. Alternatively, the system may default to canceling the adjustment.

Although all of the embodiments described above have been in terms of four panels that are adjustable individually or in pairs, it is contemplated that only a panel extension may be used. In this embodiment, fixed panels are used for letterbox or vertical letterbox but, in addition, two or four small panel extensions are defined in the OSD bit-map memory. These extensions define blocks that can be extended from the interface between the fixed panel and the active video area. Use of these panel extensions may save memory space in the OSD bit-map, allowing, for example, closed caption data to be displayed with the variable window using a relatively small amount of memory.

In the embodiments described above, the adjustable OSD window resembles a picture frame. However, those skilled in the art recognize that other patterns, colors and styles of the adjustable window 10 may be used.

While OSD parameters for creating the adjustable window are described as being input by a user, it is contemplated that the parameters may be directly communicated to the device as a component of the compressed transmitted data. Using this option, for example, a viewer may select whether subtitles are to be displayed or masked. This selection may be made in a start screen for the program, such as is provided for programming on digital video disk (DVD). In response to the selection, information on the size and location of panels that hide the subtitles may be provided from the decoded video data directly to the OSD and video processor 50 without any user intervention.

Although the exemplary system is described in terms of a hardware implementation, it is contemplated that it may be practiced entirely in software running on a computer. This software may be embodied in a carrier such as magnetic or optical disk or a radio frequency or audio frequency carrier wave.

Although illustrated and described above with reference to certain specific embodiments, the present invention is nevertheless not intended to be limited to the details shown. Rather, various modifications may be made in the details within the scope and range of equivalents of the claims.

What is claimed is:

1. A method of providing an adjustable window for masking undesirable video artifacts of a displayed image that is produced from a video signal by a system having an on screen display (OSD) function, the method comprising the steps of:

generating an overlay video signal representing at least one masking panel, the video signal being produced by the OSD function;

using the OSD function, changing the overlay video signal to vary at least one dimension of the at least one masking panel, responsive to a control signal; and mixing the overlay video signal representing the masking panel with the video signal representing the displayed image to produce a composite display in which the at least one masking panel hides the artifact in the displayed image.

2. A method according to claim 1 wherein the at least one masking panel includes upper and lower masking panels positioned above and below the displayed image, respectively and being coextensive in width with the displayed image, and the step of using the OSD function to change the overlay video signal includes the steps of:

receiving commands from a viewer; and responsive to the commands, generating the control signal for the OSD function to change at least one of the upper and lower masking panels in height to mask at least a portion of the displayed image.

3. A method according to claim 2, wherein the step of receiving commands from a viewer includes the steps of:

displaying a masking panel menu including selections for the upper and lower masking panels;

receiving a selection command from the viewer selecting one of the upper and lower masking panels; and receiving commands from the viewer to change the selected masking panel in height.

4. A method according to claim 2, wherein the step of receiving commands from the viewer includes the step of receiving commands from the viewer to change both the upper and lower masking panels in height.

5. A method according to claim 2, further including the step of mixing the video signal representing the masking panel with the video signal representing the displayed image such that the displayed image is visible while the height of the selected masking panel is adjusted.

6. A method according to claim 1, wherein the step of generating the overlay video signal includes the steps of:

generating a fixed overlay video signal representing a first portion of the at least one masking panel; and generating a variable overlay video signal representing a second portion of the at least one masking panel proximate to the displayed image;

wherein the step of changing the overlay video signal changes the variable overlay video signal to the exclusion of the fixed overlay video signal.

7. A method according to claim 6, wherein the variable overlay video signal is generated by the OSD function by storing pixel values representing the variable overlay video signal into an OSD memory.

8. A method according to claim 1 wherein the step of changing the overlay video signal to vary at least one dimension of the masking panel includes the steps of:

receiving commands transmitted with the video signal that produces the displayed image; and responsive to the commands, generating the control signal to vary the at least one dimension of the at least one masking panel.

9. A method according to claim 1 wherein the at least one masking panel includes upper and lower masking panels positioned above and below the displayed image and being coextensive in width with the displayed image, and left and right masking panels positioned to the left and right of the displayed image and being coextensive in height with the displayed image, the step of using the OSD function to change the overlay video signal includes the steps of:

receiving commands from a viewer; and responsive to the commands, generating the control signal for the OSD function to change at least one of the upper, lower, left and right masking panels to mask at least a portion of the displayed image.

10. A method according to claim 9, wherein the step of receiving commands from a viewer includes the steps of:

displaying a masking panel menu including selections for the upper, lower, left and right masking panels;

receiving a selection from the viewer selecting one of the upper, lower, left and right masking panels; and receiving commands from the viewer to change the masking panel in height if the selected masking panel is one of the upper and lower panels and to change the selected masking panel in width if the selected masking panel is one of the left and right masking panels.

11. A method according to claim 9, wherein the step of receiving commands from the viewer includes the step of receiving commands from the viewer to change both the upper and lower masking panels in height.

12. A method according to claim 9, wherein the step of receiving commands from the viewer includes the step of receiving commands from the viewer to change both the left and right masking panels in width.

13. A method according to claim 9, further including the step of mixing the video signal representing the masking panels with the video signal representing the displayed image such that the displayed image is visible while the selected panel is adjusted.

14. Apparatus which provides an adjustable window for masking undesirable video artifacts of a displayed image that is produced from a video signal by a system having an on screen display (OSD) function, the apparatus comprising:

means for generating an overlay video signal representing at least one masking panel, the video signal being produced by the OSD function;

means for using the OSD function, changing the overlay video signal to vary at least one dimension of the at least one masking panel, responsive to a control signal; and means for mixing the overlay video signal representing the masking panel with the video signal representing the displayed image to produce a composite display in which the at least one masking panel hides the artifact in the displayed image.

15. Apparatus according to claim 14 wherein the at least one masking panel includes upper and lower masking panels positioned above and below the displayed image, respectively and being coextensive in width with the displayed image, and the means for using the OSD function to change the overlay video signal includes:

means for receiving commands from a viewer; and means, responsive to the received commands, for generating the control signal for the OSD function to change at least one of the upper and lower masking panels in height to mask at least a portion of the displayed image.

16. Apparatus according to claim 15, wherein the means for receiving commands from a viewer includes:

a remote control device;

means for displaying a masking panel menu including selections for the upper and lower masking panels;

means for receiving a selection command from the remote control device, the selection command selecting one of the upper and lower masking panels; and means for receiving position commands from the remote control device, the position commands changing the selected masking panel in height.

17. Apparatus according to claim 15, further including the means for mixing the video signal representing the masking panel with the video signal representing the displayed image such that the displayed image is visible while the height of the selected masking panel is adjusted.

18. A computer readable carrier including computer program instructions that cause a computer to implement a method of providing an adjustable window for masking undesirable video artifacts of a displayed image that is produced from a video signal by a system having an on screen display (OSD) function for overlaying text and graphics onto the displayed image, the method comprising the steps of:

generating an overlay video signal representing at least one masking panel, the video signal being produced by the OSD function;

using the OSD function, changing the overlay video signal to vary at least one dimension of the at least one masking panel, responsive to a control signal; and mixing the overlay video signal representing the masking panel with the video signal representing the displayed image to produce a composite display in which the at least one masking panel hides the artifact in the displayed image.

19. A computer readable carrier according to claim 18, wherein the computer program instructions that cause the computer to perform step of receiving commands from a viewer include program instructions that cause the computer to perform the steps of:

displaying a masking panel menu including selections for the upper, lower, left and right masking panels;

receiving a selection from the viewer selecting one of the upper, lower, left and right masking panels; and receiving commands from the viewer to change the masking panel in height if the selected masking panel is one of the upper and lower panels and to change the selected masking panel in width if the selected masking panel is one of the left and right masking panels.

* * * * *